United States Patent [19]
Kudoh et al.

[11] Patent Number: 5,518,826
[45] Date of Patent: May 21, 1996

[54] MAGNETO-OPTICAL RECORDING MEDIUM AND METHOD OF MANUFACTURING SAME

[75] Inventors: Yoshihiko Kudoh, Yawata; Motoyoshi Murakami; Hidetsugu Kawabata, both of Hirakata, all of Japan

[73] Assignee: Matsushita Electric Industrial Co., Ltd., Osaka, Japan

[21] Appl. No.: 79,356

[22] Filed: Jun. 21, 1993

Related U.S. Application Data

[63] Continuation of Ser. No. 549,063, Jul. 6, 1990, abandoned.

[30] Foreign Application Priority Data

Jul. 6, 1989 [JP] Japan ................... 1-174729

[51] Int. Cl.$^6$ ..................... G11B 5/66
[52] U.S. Cl. .............. 428/694 ML; 428/694 DE; 428/694 RE; 428/694 GR; 428/694 SG; 428/900; 369/13
[58] Field of Search .......... 428/694 SG, 694 ML, 428/900, 694 DE, 694 RE, 694 GR; 369/13

[56] References Cited

U.S. PATENT DOCUMENTS 4,615,944  10/1986  Gardner ................... 428/332

FOREIGN PATENT DOCUMENTS 111988  6/1984  European Pat. Off. .

OTHER PUBLICATIONS

Hong et al "Magnetron– and diode–sputtered polycrystalline Fe and amorphous Tb(FeCo) Films: Morphology and magnetic properties," J. Appl. Phys. 59(2), Jan. 1986; pp. 551–556.
Leamy et al "Microstructure and magnetism in amorphous RE–TM thin films. II: Magnetic Anisotropy" *J. Appl. Phys.* 50(4); Apr., 1979; pp. 2871–2882.
Naoe et al., "J. Appl. Phys." 63 (8) 3850–3852, Apr. 15, 1988.
Lin et al., "J. Appl. Phys." 63 (8) 3835–3837, Apr. 15, 1988.

*Primary Examiner*—Leszek Kiliman
*Attorney, Agent, or Firm*—Wenderoth, Lind & Ponack

[57] ABSTRACT

A magneto-optical recording medium operable with a low external magnetic field intensity during recording and erasing and attenuating a variation in the external magnetic field intensity comprises a magneto-optical recording layer and protective and reflective layer provided adjacent to the magneto-optical recording layers, each of which has a size of microstructures (which are associated with the non-uniformity in composition, density, crystallizability, and the like and visible under a transmission electron microscope) less than the width of a magnetic domain wall in the magneto-optical recording layer.

2 Claims, 4 Drawing Sheets

|← 50 nm →|

MAGNETO-OPTICAL
RECORDING LAYER

|← 12.5 nm →|

PROTECTIVE LAYER

|← 50 nm →|

MAGNETO-OPTICAL
RECORDING LAYER

|← 12.5 nm →|

PROTECTIVE LAYER

RECORDING LAYER { 31: TbFeCo FILM / 32: DyFeCo FILM / 33: YTbFeCo FILM / 34: NdTbFeCo FILM } (1st EMBODIMENT)
35: TbFeCo FILM (PRIOR ART)

61: TbFeCo RECORDING LAYER (2nd EMBODIMENT)
62: TbFeCo RECORDING LAYER (PRIOR ART)

MAGNETO-OPTICAL RECORDING MEDIUM AND METHOD OF MANUFACTURING SAME

This application is a continuation of now abandoned application, Ser. No. 07/549,063, filed Jul. 6, 1990.

BACKGROUND OF THE INVENTION

1. Field of the Invention

The present invention relates to a magneto-optical recording medium for recording data by heating with the use of a laser beam and reproducing it by means of the magneto-optical effect and a method of making the same.

2. Description of the Prior Art

A prior art magneto-optical recording medium is known having such a substantial arrangement as shown in FIG.7 or 8. In the arrangement, a magneto-optical recording layer 3 of a perpendicular magnetic anisotropy film, e.g. of amorphous rare-earth-transition-metal alloy film, which offers a relatively higher magneto-optical effect, is provided on a substrate 1 through a protective layer 2. The magneto-optical recording layer 3 is then covered with another protective layer 4 directly or through a reflective layer 5. In operation, the recording and erasing procedures are carried out, in a thermomagnetic manner, by locally heating the magneto-optical recording layer 3 to over a compensation temperature or about a curie temperature with the irradiation of a laser beam 6 onto the magneto-optical recording medium and simultaneously, applying an external magnetic field 7 in a direction at right angle to the layer 3. Also, the reproduction is made by irradiating linearly polarized weak power laser beam 6 onto the magneto-optical recording layer 3 carrying recorded data and detecting the direction of magnetization in the incident area by means of the Kerr magneto-optical effect or the Faraday (magneto-optical) effect.

Specifically, there are two methods for magneto-optical recording-an optical modulation recording method for recording by modulating the irradiating laser beam power according to a signal to be recorded under a specific recording magnetic field strength, and a magnetic-field modulation recording method for recording by modulating the direction of the recording magnetic field according to a signal to be recorded under a specific constant laser power irradiation.

The disadvantages of the foregoing prior art magneto-optical recording medium are that, particularly in recording and erasing as follows:

1) A relatively greater rate of the external magnetic field intensity (e.g. about 300 Oe for the magneto-optical recording layer of TbFeCo) is needed for satisfactory saturation of the S/N (signal-to-noise) ratio of a reproduced signal, thus causing the magnetic field supplying device of a recording apparatus to be bulky in size or making it difficult to use a magnetic-field modulation recording method which requires a frequency range of some megahertz in the magnetic field.

2) The required intensity of the external magnetic field varies depending on the area of the magneto-optical recording layer.

SUMMARY OF THE INVENTION

It is an object of the present invention to provide a magneto-optical recording medium operable with a low external magnetic field intensity during recording and erasing and a small variation in the required external magnetic field intensity, and a method of manufacturing the same.

For achievement of the foregoing object, according to the present invention, the size of each microstructure (which is formed due to the poor uniformity in composition, density, crystallinity, and the like and visible with a transmission electron microscope as shown in FIG.9) in a magneto-optical recording layer and protective and reflective layers is made, smaller than the width of a magnetic domain wall in the magneto-optical recording layer.

With the aforementioned arrangement, the intensity of external magnetic field needed for recording or erasing can be reduced and also, minimized in variation.

For undertaking a satisfactorily saturated reproduction S/N ratio by the recording and erasing with the use of a low external magnetic field intensity, it is essential that: 1) each bit (or a magnetic domain) recorded in the magneto-optical recording layer under the low external magnetic field intensity is clearly defined as a region of unidirectional magnetization without boundary obscurity and has an appropriate size of area relative to the diameter of a laser beam spot; and 2) no recorded bit is present after the erasing procedure with the low external magnetic field intensity. To satisfy the foregoing requirements during the recording and erasing by locally heating the magneto-optical recording layer to as high as over a compensation temperature or about a curie temperature and applying an external magnetic field vertical to the layer, each of the magneto-optical layer and the protective and reflective layers needs to have high uniformity in both the optical and thermal properties ensuring no disorder in the thermal distribution of a locally heated area and also, the development and erasure of bits in the magneto-optical recording layer at a high temperature should be carried out without difficulty by lower levels of the external magnetic field intensity.

The existence of microstructures in the magneto-optical recording layer, which are oriented due to the poor uniformity of composition, density, crystallinity, and the like and visible through a transmission electron microscope, involves a microscopic inequality in the magnetic domain wall energy which causes a magnetic domain wall defining a bit (the magnetic domain), which is to be developed during the recording (or erased during the erasing), to be hooked up (known as pinning phenomenon of magnetic domain wall). Accordingly, if the external magnetic field strength is too small, the development or complete erasure of a bit which is clearly defined without boundary fault and has an appropriate size of area will fail to be accomplished.

The magnetic domain wall is an area where the direction of electron spin determining the magnetization is gradually shifted. Hence, when the size of the microstructure is smaller than the width of the magnetic domain wall, the interaction between the magnetic domain wall and the microscopic magnetic domain wall energy inequality resulting from the microstructure will be decreased, allowing the magnetic domain wall to be easily displaced. As the result, the recording and erasing with a low level of external magnetic field intensity becomes feasible.

Also, to more fully accomplish the recording or erasing with a low external magnetic field intensity, the protective and reflective layers adjacent to the magneto-optical recording layer may also have a size of microstructure smaller than the width of a magnetic domain wall. This is for the reason that: 1) the microstructural characteristics of the protective layer on which the magneto-optical recording layer is disposed affect the properties of the magneto-optical recording layer; and 2) the existence of microstructures in the protective or reflective layer adjacent to the magneto-optical recording layer causes a disorder in the thermal distribution of a locally heated area during the recording or erasing.

As described above, the magneto-optical recording medium and the method of making the same according to the present invention allow the external magnetic field strength needed for recording and erasing operation to be reduced and minimized in variation.

DESCRIPTION OF THE PREFERRED EMBODIMENTS

Figure 1:
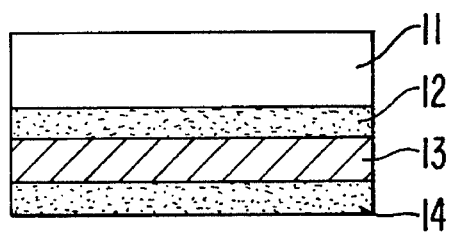
FIG. 1 is a schematic cross sectional view of a magneto-optical recording medium showing a first embodiment of the present invention.

FIG. 1 is a schematic cross sectional view of a magneto-optical recording medium showing a first embodiment of the present invention, in which a magneto-optical recording layer 13 is interposed between two protective layers 12 and 14. As shown in FIG. 1, there are provided a substrate 11 made of glass or plastics, two protective layers 12 and 14 made of $ZnSeSiO_2$, and a magneto-optical recording layer 13 made of an amorphous rare-earth-transition-metal alloy, e.g. TbFeCo, DyFeCo, NdTbFeCo, or YTbFeCo. The layers are formed on the substrate 11 respectively by sputtering procedure such that the thickness of the protective layer 12, the magneto-optical recording layer 13, and the protective layer 14 are 83 nm, 100 nm, and 83 nm respectively. To have smaller size of microstructures in each layer, the sputtering procedure is carried out in an intermittent manner (preferably, the ratio of film depositing time to intermission time is 1:4 to 4:1) under the conditions of 40° C. to 100° C. of the substrate temperature, at least 2 $W/cm^2$ of the target application power, 1 to 20 mTorr of the Ar gas pressure, and $10^{-6}$ Torr or lower of the residual gas pressure.

Figure 2:
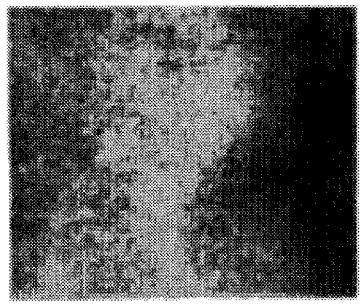
FIG. 2 shows photographs taken by a transmission electron microscope (TEM) showing a magneto-optical recording layer and a protective layer in the magneto-optical recording medium of the first embodiment of the present invention.
Figure 2:
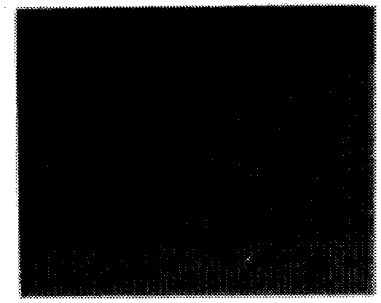
Figure 9:
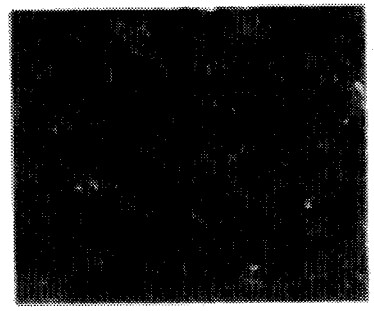
FIG. 9 shows photographs taken by a transmission electron microscope (TEM) showing the magneto-optical recording layer and protective layer in a magneto-optical recording medium produced by a prior art method.
Figure 9:
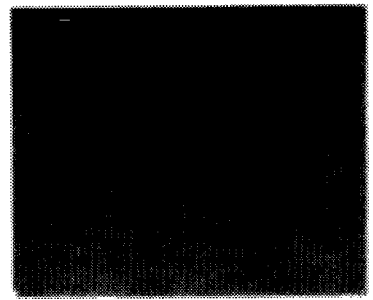

FIG. 2 shows transmission electron microscope photographs showing the magneto-optical recording layer 13 and the protective layer 12 produced by the foregoing procedure, in which the average size of microstructure is less than 5 nm, which is much smaller than that, about 20 to 30 nm, in a prior art magneto-optical recording layer or protective layer shown in FIG. 9. The width of a magnetic domain wall in the amorphous rare-earth-transition-metal alloy, e.g. TbFeCo, is about and virtually, greater than the size of the microstructure in the magneto-optical recording or protective layer according to the present invention.

Figure 3:
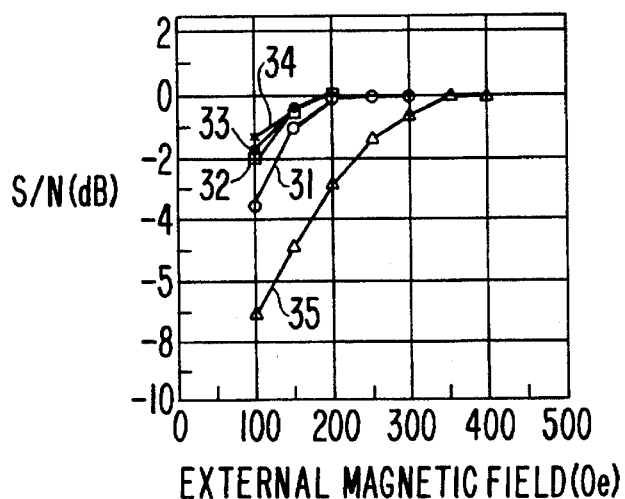
FIG. 3 is a diagram of the dependence of the reproduction S/N ratio on the external magnetic field strength in recording and erasing, comparing between the magneto-optical recording medium of the first embodiment of the present invention and a prior art magneto-optical recording medium.
Figure 7:
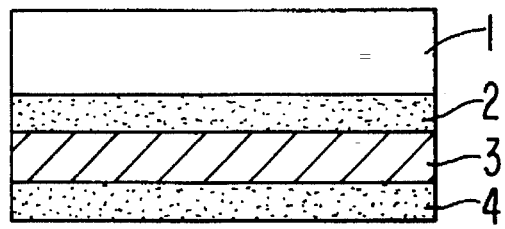
FIG. 7 is a schematic cross sectional view showing a prior art magneto-optical recording medium.

The comparison of the magneto-optical recording medium of the first embodiment with a prior art magneto-optical recording medium (FIG. 7) is shown in FIG. 3, in respect of the dependence of the reproduction S/N ratio on the external magnetic field strength in recording and erasing. Both the recording and erasing operations are carried out using the same intensity of external magnetic field. The reproduction S/N ratio is saturated when the external magnetic field intensity is 150 to 200 Oe as expressed by the curves 31 to 34 representing the magneto-optical recording mediums of the first embodiment, while compared with about 350 Oe in the prior art magneto-optical recording medium represented by the curve 35. Thus, when the size of the microstructure in the magneto-optical and protective layers is smaller than the width of the magnetic domain wall, the recording and erasing magnetic field strength needed for saturation of the reproduction S/N ratio can be reduced to as low as possible.

The magneto-optical recording medium of the present invention has uniformity in the properties of each layer, thus lowering the variations in the external magnetic field intensity and providing good uniformity in the characteristics during the recording or erasing.

Although the first embodiment employs an amorphous rare-earth-transition-metal alloy film as the magneto-optical recording layer and a $ZnSeSiO_2$ film as the protective layer, a variety of other materials can be used with equal success; for example, a Heusler alloy film, a spinel ferrite film, or a hexagonal system ferrite film as the magneto-optical layer and a ZnS film, a ZnSe film, an oxide film, a nitride film, or a mixture film thereof as the protective layer, according to the principles of the present invention.

Figure 4:
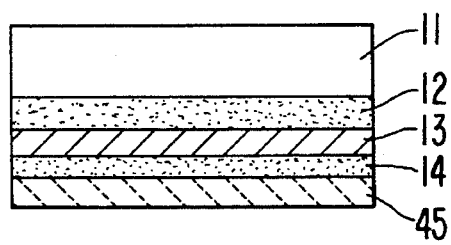
FIG. 4 is a schematic cross sectional view of another magneto-optical recording medium according to the first embodiment.

The present invention also resides in a modified magneto-optical recording medium having an arrangement shown in FIG. 4, in which a reflective layer 45 is added to the magneto-optical recording medium of FIG. 1, of which magneto-optical recording layer 13 and protective layer 14 are decreased in thickness.

Figure 5:
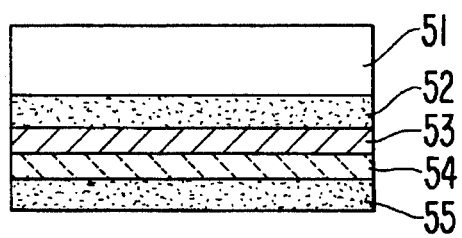
FIG. 5 is a schematic cross sectional view of a magneto-optical recording medium showing a second embodiment of the present invention.

FIG. 5 is a schematic cross sectional view of a magneto-optical recording medium showing a second embodiment of the present invention, in which a magneto-optical recording layer 53 is interposed between a protective layer 52 and a reflective layer 54. As shown in FIG. 5, there are provided a substrate 51 made of glass or plastics, two protective layers 52 and 55 made of $ZnSeSiO_2$, a magneto-optical recording layer 53 made of an amorphous rare-earth-transition-metal alloy, e.g. TbFeCo, and a reflective layer 54 made of Al. The layers are formed on the substrate 51 respectively by sputtering procedure such that the thickness of the protective layer 52, the magneto-optical recording layer 53, the reflective layer 54, and the protective layer 55 are 83 nm, 40 nm, 40 nm, and 83 nm respectively. The same sputtering procedure as of the first embodiment is used for producing the magneto-optical recording medium of the second embodiment. As the result, the size of microstructure in each layer is smaller than the width of a magnetic domain wall in the magneto-optical recording layer 53, which can be seen via a transmission electron microscope.

Figure 6:
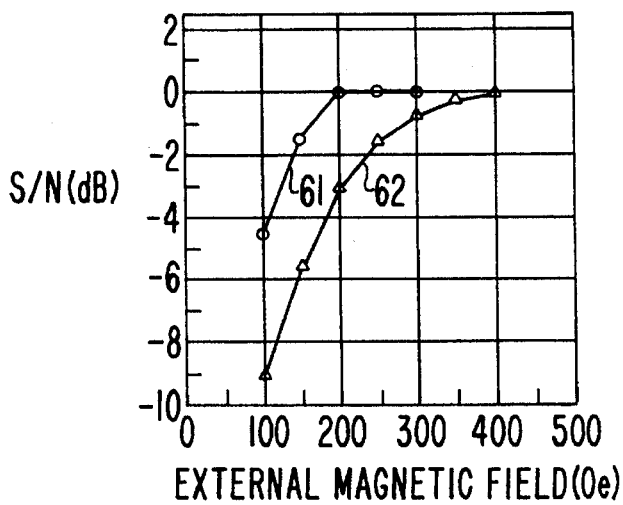
FIG. 6 is a diagram of the dependence of the reproduction S/N ratio on the external magnetic field strength in recording and erasing, comparing between the magneto-optical recording medium of the second embodiment of the present invention and a prior art magneto-optical recording medium.
Figure 8:
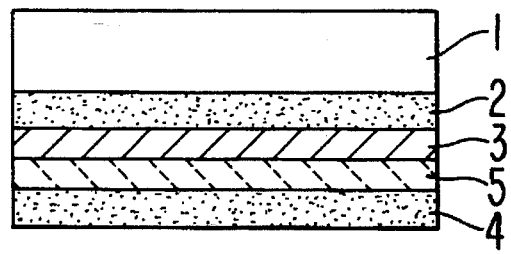
FIG. 8 is a schematic cross sectional view showing another prior art magneto-optical recording medium.

FIG. 6 is a diagram showing the comparison of the magneto-optical recording medium of the second embodiment with a prior art magneto-optical recording medium (FIG. 8) in respect of the dependence of the reproduction S/N ratio on the external magnetic field strength in recording and erasing. Also, both the recording and erasing operations are carried out using the same intensity of external magnetic field. The reproduction S/N ratio is saturated when the external magnetic field intensity is about 200 Oe as expressed by the curve 61 representing the magneto-optical recording medium of the second embodiment, while compared with around 350 Oe in the prior art magneto-optical recording medium represented by the curve.65. Thus, like the first embodiment, the size of the microstructures in the magneto-optical and protective and reflective layers is smaller than the width of the magnetic domain wall of the magneto-optical recording layer, so that the recording and erasing magnetic field strength needed for saturation of the reproduction S/N ratio can be reduced and the magneto-optical recording medium capable of lowering the variations in the external magnetic field intensity and providing good uniformity in the characteristics during the recording or erasing can be obtained.

Although the second embodiment employs an amorphous rare-earth-transition-metal alloy film as the magneto-optical recording layer, a $ZnSeSiO_2$ film as the protective layer, an aluminum film as the reflective layer, various other materials can be used with equal success: for example, a Heusler alloy film, a spinel ferrite film, or a hexagonal system ferrite film as the magneto-optical layer; a ZnS film, a ZnSe film, an oxide film, a nitride film, or a mixture film thereof as the protective layer; and a copper film, a gold film, or a platinum film as the reflective layer, according to the principles of the present invention.

What is claimed is:

1. A magneto-optical recording medium comprising a magneto-optical recording layer provided between two protective layers, each of the magneto-optical recording layer and the two protective layers having therein microstructures which have been formed due to non-uniformity of composition, density and crystallinity of each layer and are visible through a transmission electron microscope, wherein each of the microstructures in each of the magneto-optical recording layer and the two protective layers has a size smaller than a width of a magnetic domain wall in the magneto-optical recording layer and wherein the magneto-optical recording layer is an amorphous rare-earth-transition-metal alloy film.

2. The magneto-optical recording medium according to claim 1, wherein the size of each of the microstructures in each of the magneto-optical recording layer and the two protective layers is less than 5 nm.

* * * * *